2 Sheets--Sheet 2.

E. W. MORTON.
Mechanical Power.

No. 136,088.  Patented Feb. 18, 1873.

Witnesses
E. F. Kastenhuber
Ernst Bilhuber

Inventor.
Edward W. Morton

UNITED STATES PATENT OFFICE.

EDWARD W. MORTON, OF BROOKLYN, E. D., NEW YORK.

IMPROVEMENT IN MECHANICAL POWERS.

Specification forming part of Letters Patent No. 136,088, dated February 18, 1873.

*To all whom it may concern:*

Be it known that I, EDWARD W. MORTON, of Brooklyn, E. D., in the county of Kings and State of New York, have invented a new and Improved Mechanical Power; and I do hereby declare the following to be a full, clear, and exact description thereof, which will enable those skilled in the art to make and use the same, reference being had to the accompanying drawing forming part of this specification, in which drawing—

Figure 1:
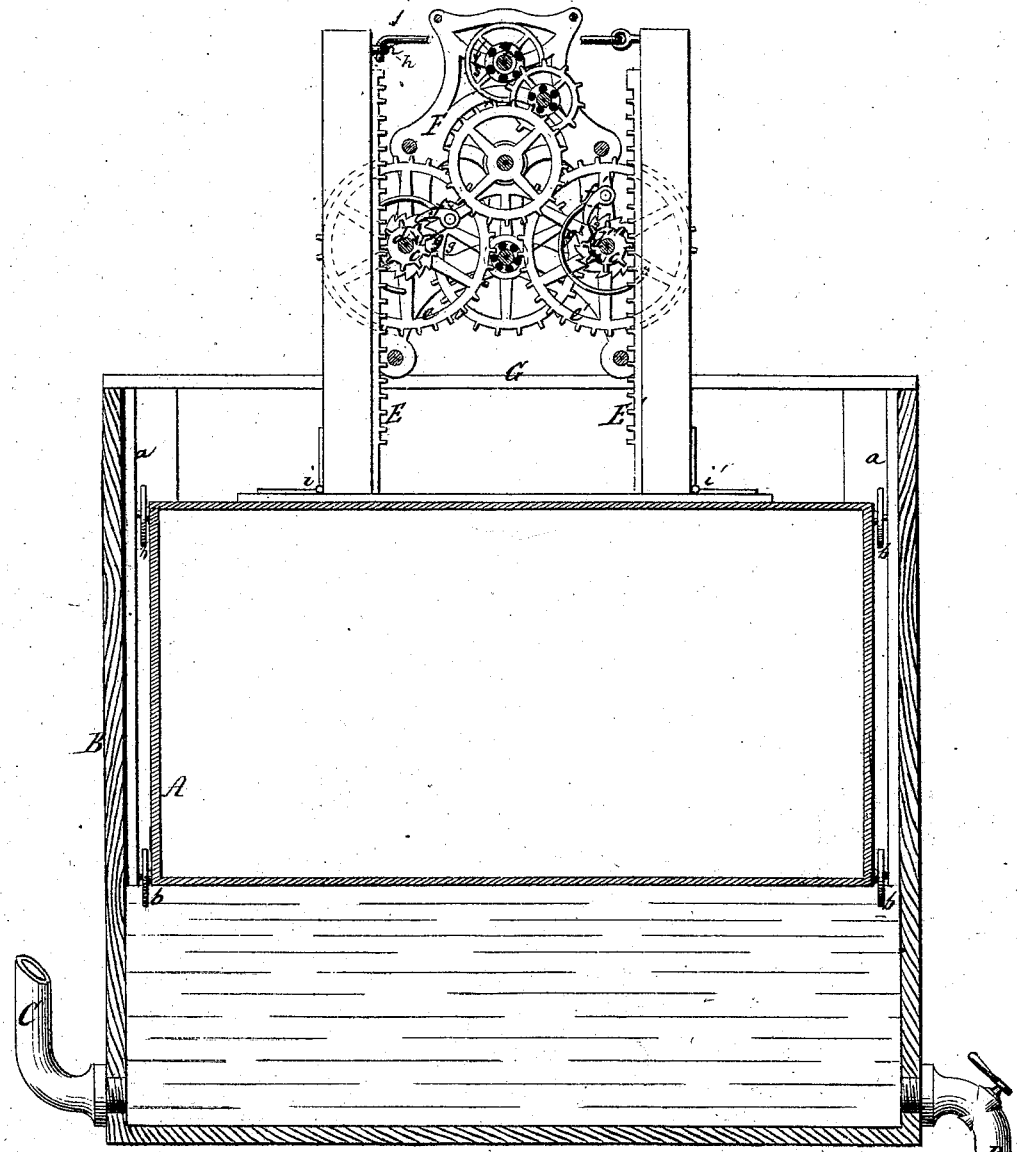
Figure 2:
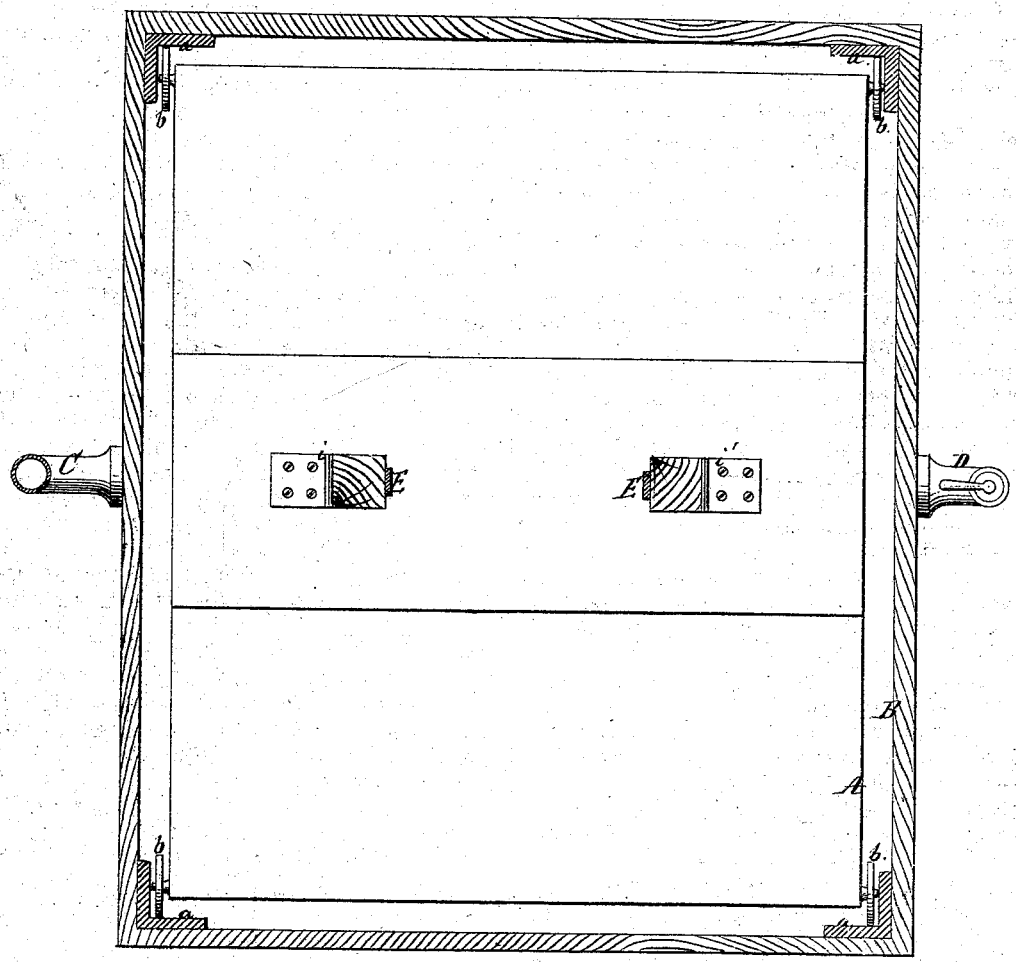

Figure 1 represents a sectional front view of my invention. Fig. 2 is a horizontal section of the same.

Similar letters indicate corresponding parts.

This invention consists in the arrangement of two racks which rise from a float and gear in pinions mounted on shafts, which are connected by suitable gear-wheels with the shaft to which motion is to be imparted, said gear-wheels being so arranged that one turns loose on its shaft while the other is fast, and vice versa, and that when the float rises the working-shaft is turned by one of said gear-wheels, and when the float descends the working-shaft is turned still in the same direction by the other gear-wheel. The racks which rise from the float are connected to the same by hinge-joints, so that they can be thrown in and out of gear with the pinions at will, and they are locked in position by a suitable catch or traverse at their upper ends. The float is fitted in a tank which is provided with a supply and with a discharge-pipe, so that when the supply-pipe is opened and the discharge-pipe closed the float rises, and vice versa; and said pipes are provided with valves, which are changed automatically at the proper intervals.

In the drawing, the letter A designates a float, which is fitted into a tank, B, so that it rises and falls therein with the least possible friction. To effect this purpose, the tank is provided with guide-strips $a$, and the float is furnished with friction-wheels $b$, whereby the latter, as it rises and falls, is prevented from binding. The tank B is supplied with water or other suitable liquid by means of a pipe, C, and as the same fills the float moves upward in the tank. When the float has moved up as far as may be desirable, the supply-pipe C of the tank is closed and the discharge-pipe D is opened, and as the liquid runs out of the tank B the float sinks down by its inherent gravity. Both the supply and the discharge-pipes are provided with suitable valves, which are to be connected to the float, so that the same are opened and closed automatically at the proper intervals, and thereby the motion of the float is kept up as long as the requisite quantity of liquid can be supplied. From the float A rise two racks, E E', which gear in pinions $c$ $c'$ mounted on shafts $d$ $d'$, that have their bearings in a frame, F, secured on a bridge or platform, G, which is fastened on the tank B. On the shafts $d$ $d'$ are mounted loosely two cog-wheels, $e$ $e'$, which are provided with pawls $f f'$ engaging with ratchet-wheels $g$ $g'$ that are mounted firmly on the shafts $d$ $d'$, so that the cog-wheel $e$ is caused to revolve when the shaft $d$ turns in the direction of arrow 1, while the cog-wheel $e'$ is caused to revolve when the shaft $d'$ turns in the direction of arrow 2. The cog-wheels $e$ $e'$ are connected with the working-shaft $h$ by intermediate gear-wheels, so that when either of said cog-wheels is caused to revolve with its shaft, the working-shaft will be turned in one and the same direction. If the float rises, the cog-wheel $e$ is caused to revolve with its shaft, while the cog-wheel $e'$ turns loosely, and the working-shaft is rotated in the direction of arrow 3; and if the motion of the float is reversed the cog-wheel $e'$ revolves with its shaft $d'$, and the motion of the working-shaft continues in the same direction as before. The racks E E' are connected to the float A by hinge-joints $i$ $i'$, and on the upper end of one of said racks is secured a hook, $j$, which can be made to engage with a loop, $k$, secured to the other rack. When the hook $j$ is disengaged from the loop $k$ the racks E E' can be thrown back out of gear with the pinions $c$ $c'$, and the float can be moved up or down without imparting motion to the working-shaft.

It is obvious that in place of the hook and loop any other suitable fastening device might be employed to retain the racks in gear with their pinions.

The supply of liquid for the tank B may be derived from any desired source. The tank may be so placed that the water in the same rises and falls with the tide, or the supply of water may be taken from a reservoir; and, if desired, the water which discharges from the tank may be returned to said reservoir by a pump, or other suitable means.

What I claim as new, and desire to secure by Letters Patent, is—

1. The combination of a float, A, tank B, racks E E', pinions $c$ $c'$, cog-wheels $e$ $e'$, and working-shaft $h$, substantially as and for the purpose herein shown and described.

2. The hinge-joints $i$ $i'$ at the bottom ends of the racks E E', in combination with a suitable fastening device at the upper ends of said racks when the racks are connected with a float, A, tank B, pinions $c$ $c'$, cog-wheels $e$ $e'$, and working-shaft $h$, substantially in the manner and for the purpose herein set forth.

This specification signed by me this 20th day of January, 1873.

EDWARD W. MORTON.

Witnesses:
W. HAUFF,
E. F. KASTENHUBER.